US006686414B1

(12) United States Patent
Anderson et al.

(10) Patent No.: US 6,686,414 B1
(45) Date of Patent: Feb. 3, 2004

(54) AQUEOUS SUPERABSORBENT POLYMER AND METHODS OF USE

(75) Inventors: Stewart C. Anderson, Eden Prairie, MN (US); Wayne P. Miller, St. Paul, MN (US)

(73) Assignee: H. B. Fuller Licensing & Financing Inc., St. Paul, MN (US)

( * ) Notice: Subject to any disclaimer, the term of this patent is extended or adjusted under 35 U.S.C. 154(b) by 0 days.

(21) Appl. No.: 09/548,210

(22) Filed: Apr. 13, 2000

Related U.S. Application Data

(60) Provisional application No. 60/129,145, filed on Apr. 14, 1999.

(51) Int. Cl.$^7$ ................................. C08L 33/02
(52) U.S. Cl. ...................... 524/556; 524/549
(58) Field of Search .................... 524/556, 549

(56) References Cited

U.S. PATENT DOCUMENTS

| | | | | | |
|---|---|---|---|---|---|
| 4,090,013 A | * | 5/1978 | Ganslaw et al. | .......... | 525/329.9 |
| 4,563,289 A | * | 1/1986 | Thompson | .............. | 427/389.8 |
| 4,702,944 A | * | 10/1987 | Thompson | .............. | 427/389.8 |
| 4,721,647 A | | 1/1988 | Nakanishi et al. | .......... | 428/283 |
| 4,732,786 A | * | 3/1988 | Patterson et al. | ........... | 427/261 |
| 4,808,637 A | | 2/1989 | Boardman et al. | ......... | 521/50.5 |
| 4,914,170 A | | 4/1990 | Chang et al. | | |
| 5,075,344 A | | 12/1991 | Johnson | ....................... | 521/140 |
| 5,079,034 A | | 1/1992 | Miyake et al. | ............. | 427/45.1 |
| 5,122,544 A | | 6/1992 | Bailey et al. | | |
| 5,126,382 A | * | 6/1992 | Hollenberg | ................... | 524/56 |
| 5,244,934 A | | 9/1993 | Umeda et al. | | |
| 5,489,469 A | | 2/1996 | Kobayashi et al. | .......... | 428/283 |
| 5,693,707 A | | 12/1997 | Cheng et al. | | |
| 5,856,410 A | * | 1/1999 | Carrico et al. | ............... | 525/362 |
| 6,103,317 A | | 8/2000 | Asai et al. | ................... | 427/512 |
| 6,174,929 B1 | | 1/2001 | Hähnle et al. | ................. | 521/64 |
| 6,284,367 B1 | * | 9/2001 | Gruhn et al. | ................ | 428/355 |

FOREIGN PATENT DOCUMENTS

| | | |
|---|---|---|
| EP | 0 702 031 A | 3/1996 |
| EP | 708119 A1 | 4/1996 |
| EP | 0 882 502 A | 12/1998 |
| GB | 2 191 779 A | 12/1987 |
| WO | 96 05234 A | 2/1996 |
| WO | 98 52979 A | 11/1998 |

* cited by examiner

Primary Examiner—Judy M. Reddick

(57) ABSTRACT

The present invention relates to a crosslinked aqueous solution polymer composition consisting of about 15 wt-% to about 50 wt-% of at least one water soluble monomer, preferably an alpha, beta-ethylenically unsaturated carboxylic acid monomer and a crosslinking agent. The polymer solution is sufficiently low enough in viscosity such that it can be applied in aqueous form, yet after crosslinking possesses a fast rate of acquisition and is high absorption capacity. The invention also relates to new methods of enhancing the absorbency of various articles, increasing the humectancy and/or absorbency of a fiber or fibrous matrix, improving the water retention of soil and other agricultural methods, and increasing the open time of cement by incorporating or applying an aqueous superabsorbent polymer composition.

11 Claims, No Drawings

AQUEOUS SUPERABSORBENT POLYMER AND METHODS OF USE

"This application claims priority to U.S. provisional application Ser. No. 60/129,145, filed on Apr. 14, 1999." has been inserted.

FIELD OF THE INVENTION

The present invention relates to a crosslinked aqueous solution polymer composition consisting of about 15 wt-% to about 50 wt-% of at least one water soluble monomer, preferably an alpha, beta-ethylenically unsaturated carboxylic acid monomer and a crosslinking agent. The polymer solution is sufficiently low enough in viscosity such that it can be applied in aqueous form, yet after crosslinking possesses a fast rate of acquisition and is highly absorbent. The invention also relates to new methods of enhancing the absorbency of a various articles having nonwoven, textile or paper substrates; increasing the humectancy and/or absorbency of a fiber or fibrous matrix, improving the water retention of soil and other agricultural methods, and increasing the open time of cement by incorporating or applying an aqueous superabsorbent polymer composition.

BACKGROUND OF THE INVENTION

A superabsorbent polymer (SAP) absorbs large quantities of water as well as other fluids. SAP is typically designed to be resistant to humidity, but will swell when put in intimate contact with water. SAPs are usually prepared by either one of two methods. The first method involves sufficiently crosslinking emulsion or aqueous solution polymers to make them water insoluble, while retaining their ability to swell in water. The second method is directed at effectively modifying water-insoluble polymers with pendant hydrophilic groups to induce swelling when in contact with water.

SAPs find application in the medical, food and agricultural industries. They also find utility in many consumer products, in particular disposable absorbent articles such as disposable diapers, incontinent pads and feminine care products. The ability to provide thinner, more compact absorbent articles has been contingent on the ability to develop relatively thin absorbent cores that can acquire, distribute and store large quantities of fluid, particularly urine. As a result, there is a trend towards employing higher concentrations of SAP to achieve this goal.

SAPs are available in a particulate or powder form. In the case of diaper construction, SAPs are sifted into the absorbent core. The absorbent core is sandwiched between a fluid pervious topsheet and a fluid impervious backsheet. The incorporation of particulate SAP tends to generate dust from the SAP fines. Further, conventional absorbent articles have the limitation of the SAP not being sufficiently immobilized and are thus free to migrate and shift during the manufacturing process, shipping/handling and/or use. Movement of the SAP particles during manufacture can lead to handling losses as well as improper distribution of the particles.

Further, absorbency problems occur when the SAP particles migrate prior to, during and after swelling. This inability to fix the particles at optimum locations leads to insufficient fluid storage in one area and over-capacity in other areas. Another important factor is the liquid permeability of the SAP. It has been discovered that the fluid transport properties of the gel layer formed as a result of the swelling SAP particles in the presence of fluids is extremely important. Although the formation of a SAP gel layer fluid barrier, known as "gel blocking" is desirable for some applications, such as for use in cables, the formation of gel layers in disposable absorbent products is undesirable since it greatly reduces the efficiency of the SAP. Thus, the advantages of being able to fixate SAP particles in place are apparent and several ways of accomplishing such have been suggested.

There are many patents pertaining to crosslinkable water soluble/swellable polyacrylate based compositions. However, consistent with the fact that commercially available SAP tends to be in granular, particulate or powdered form, the impetus of the prior art is aimed at making highly viscous emulsions and dispersions that are subsequently dried, masticated, pulverized or ground to the desired size.

For example, Chang et al., U.S. Pat. No. 4,914,170 issued Apr. 3, 1990 relates to superabsorbent polymeric compositions prepared from a monomer including acrylic acid and an effective amount of a second hydrophilic monomer, which can be a soluble salt of beta-acryloxypropionic acid. Preferably, the pH of the aqueous monomer solution is adjusted to substantially exclude free acid, and the aqueous monomer solution is coated onto a heated surface to both polymerize the monomer and dry the resulting hydrogel. Free acid thermal degradation products are avoided and the superabsorbent product has greater absorption capacity than acrylate homopolymer.

Example 1, column 13, describes the preparation of superabsorbent powder. Specifically, 700 g of acrylic acid and 77.8 g of distilled beta-acryoxypropionic acid and 1060.5 g of DI water are cooled to 5° C. The solution was neutralized with 725 g of 50% reagent grade NaOH. The temperature of the solution was maintained below 35° C. and additional NaOH solution was added to reach a pH of 8.0. The final solution had 36% solids. A portion of monomer solution was charged with crosslinking agent, initiator and surfactant just prior to polymerization. The reaction mixture was placed in a shallow tray providing a liquid layer with a thickness of 75 mils. The tray was placed in an oven at 175° C., covered with aluminum foil initially for a few minutes while the polymerization began. Thereafter the foil was removed and the material was allowed to polymerize for 30 to 45 minutes. The resulting polymer had less than 20% w/w water content and was ground to a powder.

As industry recognized the deficiencies of particulate SAP, aqueous based superabsorbent polymer compositions began to be developed. U.S. Pat. No. 5,693,707 issued Dec. 2, 1997 Cheng et al., teaches an aqueous polymer composition comprising 10 to 40% of a polymer in water, the polymer consisting essentially of 20–90 wt-% alpha, beta-ethylenically unsaturated carboxylic acid monomer, 10–80 wt-% of one or more softening monomers, the aqueous composition being adjusted to pH 4–6 with alkali metal hydroxide or alkaline earth metal hydroxide and further containing 0.1 to 3 wt-% zirconium crosslinking salt.

SUMMARY OF THE INVENTION

The present applicants have found that by simultaneously balancing the molecular weight of the polyacrylate polymer and the degree of crosslinking, a superabsorbent polymer is produced that is highly absorbent, possesses a fast rate of acquisition, and further is sufficiently low enough in viscosity prior to crosslinking such that it can be applied in an aqueous form.

The aqueous polymer composition consists essentially of one or more water soluble monomers, preferably at least one alpha, beta-ethylenically unsaturated carboxylic acid monomer and a crosslinking agent. The polymer is produced from a solution polymerization of the monomer(s) that is subsequently neutralized with a base to a pH ranging from about 7 to 10. The extent of crosslinking and compatibility of the crosslinking agent is controlled by employing a portion of volatile base in the neutralization process. The dissipation of the base upon application liberates a controlled concentration of carboxylic groups to allow crosslinking. Prior to crosslinking, the polyacrylate composition has a viscosity ranging from about 50 cPs to about 20,000 cPs and preferably from about 100 cPs to about 5,000 cPs for about a 20 wt-% solids content solution. The crosslinking agent is generally added at a weight ratio of 10 parts polyacrylate polymer to 1 part crosslinking agent. Optionally, the aqueous superabsorbent polymer composition may be combined with various water based adhesives to improve the flexibility, and/or hydrophilic properties and/or adhesive properties and/or cohesive strength. Preferably, such water based adhesives are selected and employed at concentrations such that the absorbent nature of the SAP polymer is not adversely impaired.

The invention also relates to new methods of increasing the absorbency of an absorbent article, increasing the humectancy and/or absorbency of a fiber, improving the water retention of soil as well as other agricultural processes, and increasing the finishing time of cement by applying an aqueous superabsorbent polymer composition. The methods comprise the step of applying an aqueous superabsorbent polymer composition onto a surface or substrate.

In general, the aqueous based SAP composition is easier to apply and position since it can be absorbed by and/or adhere to the substrates to which it is applied before drying and crosslinking. Further, aqueous compositions are amenable for creating continuous SAP film layers and interpenetrating networks to enhance fluid transport and distribution.

DETAILED DESCRIPTION OF THE INVENTION

The superabsorbent polymer composition of the present invention comprises an aqueous medium of 5 wt-% to about 65 wt-% solids of a polymer prepared by an aqueous solution polymerization of one or more water soluble monomers. The preferred water soluble monomers are alpha, beta-ethylenically unsaturated mono- or dicarboxylic acids and acid anhydrides, such as acrylic acid, methacrylic acid, crotonic acid, maleic acid/anhydride, itaconic acid, fumaric acid and the like with acrylic acid being the most preferred. The polymerization of such monomers produces an alkali soluble polyelectrolyte. Small amounts of other water soluble monomers may be incorporated. Examples may include 2 hydroxyethyl acrylate, 2 hydroxyethyl methacrylate, vinyl pyrolidone, acrylamide, methacrylamide, sodium vinyl sulfonate, 1-allyloxy-2-hydroxypropane sulfonate, etc. The invention also contemplates the use of small amounts of water insoluble monomers provided the intended properties of the pre-crosslinked and/or post-crosslinked polymer are not adversely affected.

Any free radical generating source, such as peroxides and persulfates, may be used to initiate the polymerization of the monomers and carry out the polymerization well known to those skilled in the art. Further, chain transfer agents known in the art may be employed to alter the molecular weight.

The aqueous composition of the carboxylic acid-containing polymer contains about 5 wt-% to about 65 wt-%, preferably about 10 wt-% to about 50 wt-%, and more preferably about 20 wt-% to about 40 wt-% solids. Once polymerized, the aqueous composition is adjusted to a pH of about 7–10 using an alkali metal hydroxide, such as sodium hydroxide or potassium hydroxide, and/or an alkaline earth metal hydroxide, such as calcium hydroxide. Further, a metal alkoxide can be used in place of the metal hydroxide. It is preferred to first neutralize from about 50% to 95%, more preferably from about 65% to 85% and most preferably about 75% of the acid groups with the alkali metal hydroxide and then further neutralized with a volatile fugitive alkaline component to a pH of 7.0 or above. At least a portion of the volatile/fugitive base dissipates upon application of the aqueous SAP to the substrates, but not prior to use. The dissipation of the base liberates a sufficient portion of the carboxylate groups to the free acid (carboxylic) form. This liberation allows for reaction with the crosslinking agent.

The viscosity of the aqueous polyacrylate polymer solution ranges from about 50 cPs to about 50,000 cPs, more typically from about 100 cPs to about 30,000 cPs, preferably from about 100 cPs to about 20,000 cPs, more preferably from about 100 cPs to about 10,000 cPs, even more preferably from about 100 cPs to about 5,000 cPs and most preferably from about 100 cPs to about 2500 cPs. At too high of a viscosity the aqueous solution is difficult to handle and process, whereas at too low of a viscosity the ability to absorb fluid is substantially diminished. It is most preferred that the aqueous polyacrylate polymer is sufficiently low in viscosity such that the composition may be applied via spray techniques and/or saturate and/or coat a surface or substrate. The aqueous, alkaline polyacrylate solution viscosity, as a function of percent solids, corresponds to the molecular weight.

To effect crosslinking of the polymer through its carboxylic acid functionality and thus create a superabsorbing polymer, a sufficient amount of crosslinking agent is added to the aqueous polymer composition. Suitable crosslinking agents include any substance that will react with the hydrophilic groups of the aqueous solution polymer. The selection and concentration of crosslinking agent will affect the absorbent rate and capacity. It is desirable that the crosslinking agent employed "reacts" with the functional groups on the polyacrylate polymer in less than 24 hours and at ambient (20° C.) and/or elevated temperatures. Although any of the variety of known crosslinking agents may be employed, such as those described in U.S. Pat. No. 4,090,013, incorporated herein by reference, the use of zirconium ions alone or admixed with ferric aluminum, chromic or titanium ions as well as aziridine have been found to be particularly useful. The most preferred crosslinking agent is ammonium zirconyl carbonate commercially available as Bacote 20 and Zirmel 1000, from Magnesium Elektron, Inc, Flemington, N.J. Further, the aziridine crosslinking agent is available from Zeneca Resins, Wilmington, Mass. as Neocryl CX-100. The aqueous crosslinking agent is added to the aqueous polyacrylate solution at a concentration ranging from about 2 parts to about 10 parts, preferably from about 2 parts to 8 parts and most preferably from about 4 parts to 6 parts. Once dried, this amount corresponds to a weight ratio of about 10 parts polymer to about 1 part crosslinking agent, based on polymer solids.

As mentioned previously, the extent of crosslinking is critical to the absorbent properties. At increased crosslinking agent concentrations, the polyacrylate crosslinks to a greater extent increasing the total fluid holding capacity under load. Conversely, at low crosslinking agent concentrations, the total absorbent capacity under load is reduced. Further, the viscosity is critical to the ease of application. The present inventors have unexpectedly discovered an optimum balance of crosslinking to obtain a superabsorbent polymer that is highly absorbent, possesses a fast rate of acquisition, and further is sufficiently low enough in viscosity such that it can readily be applied in an aqueous form. The crosslinked polymer absorbs about 50 to 150 and preferably about 100 times its weight of the polymer in water. Under conditions of very low humidity, the crosslinked polymer may become sufficiently dehydrated such that the dried polymer film is friable. However, at atmospheric conditions, wherein the relative humidity ranges from 20% to 85%, the dried polymer is typically translucent and flexible due to its hydroscopic nature and propensity to be in equilibrium with the moisture content of its environment. In preferred embodiments, the crosslinked polymer absorbs at least about 5 wt-%, preferably at least about 10 wt-% and more preferably at least about 20 wt-% of moisture from the air at ambient temperature and about 50% relative humidity.

In addition to applying the aqueous polymer composition comprising the polyacrylate polymer and metal crosslinking compound as a mixture, the aqueous polymer can be applied first, followed by the application of the crosslinking metal compound in an aqueous medium in a two-step process. Preferably, the polyacrylate polymer is dried prior to application of the crosslinking agent. In a preferred embodiment, the polyacrylate polymer is suitable for spray drying resulting in a powder having a particle size of about 20 microns. Further, prior to crosslinking, the polyacrylate polymer precipitates in the presence of acid. According, a dilute acid solution may be preapplied to the substrate to minimize the penetration of the polyacrylate solution. Alternatively, the crosslinker can be first applied to the substrate and dried and then the aqueous polymer can be added.

The superabsorbent polymer solution typically possesses sufficient wet adhesion to adhere to the intended substrate. However, in embodiments wherein it is desirable to increase the adhesive and/or cohesive strength of the absorbent polymer solution, the inventive composition can be advantageously combined with compatible water borne emulsion polymers. Suitable water based adhesive include acrylics, vinyl acrylics, styrene acrylics, styrene butadiene rubber (SBR), vinyl acetate-versatic acid esters, vinyl acetate-ethylene (VAE) and the like. For such embodiments, the aqueous superabsorbent solution may be combined with the water based adhesive emulsion/dispersion at ratios ranging from 95:5 to 5:95, preferably from about 5:1 to 1:2, and most preferably from about 1:1 to about 2:1.

The aqueous absorbent polymer composition can be sprayed, foam coated, printed or saturated onto a surface or into a substrate. Depending on the amount of the absorbent polymer applied, the coated surface is characterized by enhanced hydrophilicity and/or enhanced absorbency. In order to provide enhanced absorbency properties to the substrate or fibers the amount of aqueous absorbent polymer employed typically ranges from about 5 wt-% to about 50 wt-% and preferably from about 10 wt-% to about 25 wt-% of the total weight of the substrate or fibers coated.

The aqueous absorbent polymer composition can advantageously be employed in the manufacture of a variety of articles, particularly disposable absorbent products as well as be employed for various agricultural uses and for extending the finishing time of cement.

In the manufacture of disposable absorbent articles, the aqueous solution polymer (or dispersion if combined with a water based emulsion polymer or dispersion) may be applied to an absorbent core substrate, namely nonstabilized cellulosic fibers, nonwoven or woven web, in liquid form in a single step operation, thus resulting in a more uniform and consistent layer of absorbent polymer onto the fibers or into the web. Upon drying, the aqueous polymer may form a continuous film layer or an interpenetrating network depending on the viscosity of the polymer solution and the porosity of the substrate to which the composition is being applied. Further, the polymer remains at the location wherein it dried. Disposable absorbent articles include disposable diapers, sanitary napkins, bandages, wound care products, surgical pads, drapes and gowns as well as various paper products such as paper towels, particularly multiple use towels, toilet paper, facial tissue and the like.

The invention is surmised to be particularly useful for producing ultra-thin feminine napkins. In this embodiment the aqueous superabsorbent polymer of the present invention is applied to the absorbent core that tends to resemble folded paper toweling. The absorbent core is then sandwiched between a body fluid pervious topsheet and a body fluid impermeable back sheet layer. The aqueous SAP is particularly preferred to overcome the granular appearance of the SAP as well as problems associated with the particulate SAP puncturing the topsheet or backsheet layers.

The absorbent aqueous polymer solution may be applied to a fiber to increase the hygroscopicity/humectancy (hydrophilicity) or for the purpose of manufacturing superabsorbent fibers having enhanced absorbent properties. Examples of useful fibers include natural cellulose fibers such as wood pulp, cotton, silk and wool; synthetic fibers such as nylon, rayon, polyesters, acrylics, polypropylenes, polyethylene, polyvinyl chloride, polyurethane, glass and the like, alone or in combination with one another. In the case of absorbent cores, the fiber layer often contains at least 50% natural and/or synthetic cellulose fibers. The superabsorbent fibers produced may be used in many applications including absorbent cores in disposable absorbent products, as well as absorbent products such as paper towels, facial tissue, toilet paper, meat-packing absorbents, etc.

Further, a self-supporting superabsorbent web may be formed by applying a sufficient amount of the aqueous absorbent polymer solution to a web of fibers. The starting fiber layer or mass can be formed by any one of the conventional techniques for depositing or arranging fibers in a web or layer. These techniques include carding, garnetting, air-laying, wet laying and the like and are well known to those skilled in the art. Individual webs or thin layers formed by one or more of these techniques can also be laminated to provide more loft and caliper. Typically, the fibers extend in a plurality of diverse directions in general alignment with the major plane of the fabric, overlapping, intersecting and supporting one another to form an open, porous structure.

The nonwoven web can be bonded with polymeric binders well known in the art, such as vinyl acetate/ethylene/N-methylolacrylamide (VAE-N-ma) copolymers, self-crosslinking acrylics and styrene-butadienes. The liquid absorbent composition may have sufficient adhesive qualities (wet and dry strength) alone to use it as both the nonwoven binder and the absorbent material.

Thus, various polymeric binders known in the art can be used to prepare nonwoven products, or fabrics, by a variety of methods known in the art which, in general, involve the impregnation of a loosely assembled mass of fibers with the aqueous emulsion nonwoven binder, followed by moderate heating to coalesce the mass. This moderate heating also serves to cure the binder by forming a crosslinked interpolymer. Before the binder is applied, it is mixed with a suitable catalyst to activate the crosslinking functional moieties on the polymer backbone. For example, an acid catalyst such as mineral acids, e.g., hydrogen chloride, or organic acids, e.g., oxalic acid, or acid salts such ammonium chloride, are suitably used by those skilled in the art. The amount of catalyst is generally from 0.10% to 2% of the total polymer.

The fibrous starting layer is subjected to at least one of several types of bonding operations to anchor the individual fibers together to form a self-sustaining web. Some of the better known methods of bonding are overall impregnation or printing the web with intermittent or continuous straight or wavy lines for areas of binder extending generally transversely or diagonally across the web and additionally, if desired, along the web.

Where the absorbent polymer composition is used also as the polymeric binder, it is applied to the fibrous starting web in an amount sufficient to form a self-supporting web and provide enhanced absorbent properties. The concentration of absorbent polymer suitably ranges from about 3 wt-% to about 100 wt-% or more of the starting web, preferably from about 10 wt-% to about 50 wt-% of the starting web. The impregnated web is then dried and cured. The nonwoven products are suitably dried by passing them through air dryers or the like and then through a curing oven. Typical conditions of time and temperature are well known in the art. Where a separate polymeric binder is used to bond the nonwoven web, the absorbent polymer is applied to the bonded web in an amount sufficient to provide enhanced absorbent properties to the web and may range from about 5 wt-% to about 50 wt-%, preferably from about 10 wt-% to about 25 wt-% of the web.

The aqueous superabsorbent solution of the present invention also has utility for various agricultural uses such as improving the water retention of soil and various seed germination techniques. The aqueous SAP is particularly advantageous since it can be combined with other aqueous agricultural materials such as herbicides, pesticides, fertilizer and particularly seeds. Further, the composition may be sprayed onto the soil and roots of sod, shrubs and trees during transplanting to avoid root damage. As in the case of absorbent core applications, the aqueous composition of the present invention is particularly advantageous with respect to particulate SAP due to the ability to form a SAP matrix or interpenetrating network.

The aqueous superabsorbent polymer solution is also surmised to have utility for increasing the finishing time for concrete. Hot, dry weather tends to accelerate the cure rate of cement causing it to be very difficult to finish. The aqueous polyacrylate polymer composition may be applied to the surface the wet concrete is to be poured. Secondly, a crosslinking solution is applied at a sufficient concentration to gel the polyacrylate within 30 minutes, and preferably in less than 15 minutes. Since concrete cures from the ground up, the gel layer is surmised to prevent premature curing of the concrete allowing ample time to properly finish the surface.

Other uses for the aqueous superabsorbent polymer composition of the present invention include use as an antifogging coating on masks and as a coating for certain moisture sensitive corrugated packages such as those designed to contain electronic equipment and components. The composition is further surmised to be suitable for making breathable coatings or breathable flexible films, particularly when formulated with other ingredients to equilibrate the moisture content, elasticity and flexibility, for use in disposable absorbent products. The superabsorbent solution is also surmised to be useful as a sprayable spill containment and liquid spill absorbent system.

The invention is further illustrated by the following non-limiting examples.

Test Methods

1. Total Solids of polymer emulsions/solutions is determined by first weighing an aluminum weighing dish to the nearest milligram. The emulsion/solution to be tested should be mixed or stirred to insure homogeneity. One gram +/−0.2 grams of the emulsion/solution is added to the dish and dried in an oven for 1.5 to 2.5 hours at a temperature of 130° C. The sample is cooled for approximately 5 minutes and reweighed. An average of at least two samples not differing by more than 0.3% is recorded.

2. Viscosity is determined with a Brookfield Viscometer Model RVF at 25° C. and 20 rpm's in accordance with the viscometer manufacturer's instructions.

3. pH is determined with a Coming pH meter at 25° C. in accordance with the manufacturer's instructions.

4. Water Absorption Capacity & Rate of Absorption

The polymer and crosslinker are combined at the indicated proportions and mixed until uniform. The solution is drawn down to a wet film thickness of 10 mils on a 0.25" thick glass plate. The coated glass is dried in a 110° C. oven for 15 minutes. One gram of the dried film is then placed in a 200 ml beaker to which 150 mils of water is added. The compositions were compared to one another and rated on a scale of 1 to 10 with respect to rate and total absorption capacity with a rating of "10" given to the fastest or highest total absorption capacity example. A rating of "10" corresponds to a rate of about 10 seconds or a total absorption capacity of about 150 g of water, whereas a rating of "1" corresponds to a rate of about 5 minutes or a total absorption capacity of about 10 g of water.

EXAMPLE 1

| Seq # | Percent | Formula: Raw Material |
|---|---|---|
| 1. | 42.2047 | Water, Deionized |
| 2. | 0.1753 | Hydrogen Peroxide, 50% |
| 3. | 0.0035 | Dissolvine 4.5% H-FE (Hamp-OL) |
| 4. | 16.1846 | Glacial Acrylic Acid 180–220 MEHQ |
| 5. | 1.8296 | Water, Deionized |
| 6. | 0.1671 | Hydrogen Peroxide, 50% |
| 7. | 2.7450 | Water, Deionized |
| 8. | 0.1270 | Erythorbic Acid, FCC Granular |
| 9. | 0.1827 | Water, Deionized |
| 10. | 0.0225 | Aztec T-BHP-70 |
| 11. | 0.1827 | Water, Deionized |
| 12. | 0.0156 | Erythorbic Acid, FCC Granular |
| 13. | 0.1827 | Water, Deionized |
| 14. | 0.0225 | Aztec T-BHP-70 |
| 15. | 0.1827 | Water, Deionized |
| 16. | 0.0156 | Erythorbic Acid, FCC Granular |
| 17. | 0.1329 | Caustic Soda 50% |
| 18. | 2.0725 | Water (To Adjust) |
| 19. | 12.7800 | Caustic Soda 50% |
| 20. | 4.8300 | Ammonium Hydroxide 28–30% Solution |
| 21. | 15.7908 | Water, Deionized |
| 22. | 0.1500 | Proxel, GXL Antimicrobial |

Process Procedure:
1. Charge clean reactor with water (item 1) and heat to 70° C. with nitrogen purge.
2. At 70° C., shut off nitrogen and add HOOH (item 2) and Hampol (item 3) to reactor. CAUTION, do not mix the HOOH and Hampol—A violent reaction will occur. Rinse each container separately with a small amount of the adjusting water (item 22).
3. Wait 5 minutes.
4. Then begin monomer feed (items 4) uniformly over 3 hours.
5. Also begin delayed catalyst (items 5 & 6) and delayed reducer/water (items 7 & 8) uniformly over 3½ hours.
6. Maintain batch temperature at 70–75° C. during feeds.
7. After delayed catalyst and reducer feeds, hold 30 minutes at 70 –75° C.
8. Add treat. Add TBHP (items 9 & 10). Wait one minute and then add reducer (items 11 & 12).
9. Hold 30 minutes.
10. Repeat treat using items 13 & 14, and 15 & 16.
11. Hold 30 minutes.
12. Cool to below 30° C.
13. Postadd NaOH (item 17)—Predilute with some of water from item 19 to 10% activity.
14. Adjust to 24 to 26% solids and 200–2000 cps using water (item 18).
15. Add 75% of water (item 21). Add caustic (item 19) over at least one hour with good mixing to the reactor. Keep solution below 35° C. before starting caustic feed. Keep full cooling on reactor during caustic addition. An exotherm will be evident. If batch temp exotherms over 75° C. stop or slow down the rate of caustic addition. Suggest first adding 75% of caustic, let mix 10 minutes and check pH. Then add 10% increments until pH is 5.7 to 6.0. Record actual amount used.
16. Slowly add ammonia (item 20) to obtain a pH of 7.5 to 9.5. Suggest adding 50% of ammonia, let mix 10 minutes and check pH. Add additional ammonia 5–10% at a time to obtain 7.5 –9.5 pH.
17. Adjust to solids/visc specs with remaining water (item 21) after adding Proxel GXL (item 22).

| Physical Properties | | | |
|---|---|---|---|
| Property | Value | Range | Units |
| pH | 8.5 | +/−1 | |
| Tg by DSC | 100 | +/−2 | ° C. |
| Solids (1) | 22 to 24 | | % |
| Viscosity (2) | 100 to 2000 | | cps |
| pH | 7.5 to 9.5 | | |
| Weight/Gallon | 8.9 | | lbs |

EXAMPLE 2

A lower molecular weight, lower viscosity version was prepared employing the same ingredients and procedure as Example 1 with the exception that 0.4 pph thiolactic acid chain transfer agent was added to the acrylic acid feed. A very low polyacrylic acid solution was obtained having a viscosity of 50 cPs at 23% solids.

EXAMPLE 3

The same ingredients and procedures were employed as Example 1 with the exception that the feed time was reduced by 50%. This resulted in a difficult to handle high viscosity solution having a viscosity of 25,000 cPs for a 23% solids solution.

| Blend Number | Example #/ Polyacrylate Polymer - wt-% | Crosslinking Agent/ Amount - wt-% | Water Absorption Capacity Rating | Rate of Water Absorption Rating | Viscosity 20 rpms | % Solids | PH |
|---|---|---|---|---|---|---|---|
| A | Example 1 - 95% | Bacote 20 5% | 9 | 7 | 1100 | 23 | 9 |
| B | Example 2 - 95% | Bacote 20 5% | 3 | 10 | 150 | 23 | 9 |
| C | Example 3 - 95% | Bacote 20 5% | 10 | 7 | 25,000 | 23 | 9 |
| D | Example 1 - 96% | Zirmel 1000 - 4% | 9 | 7 | 1500 | 23 | 9 |
| E | Example 1 - 95% | CX100 - 2% | 9 | 6 | 1400 | 23 | 9 |
| F | Example 1 - with 3% less NaOH/95% | Bacote 20 5% | 10 | 5 | 800 | 22 | 8 |
| G | Example 1 w/o ammonia/95% | Bacote 20 5% | Not stable - gelled immediately with Bacote | | | | 6 |
| H | Example 1 - 93% | Bacote 20 7% | 10 | 6 | 900 | 23 | 9 |
| I | Example 1 - 97% | Bacote 20 3% | 4 | 9 | 1200 | 23 | 9 |

What is claimed is:
1. An aqueous composition comprising:
a homopolymer derived from an α-β-ethylenically unsaturated carboxylic acid monomer, said homopolymer having been from about 75% to 95% neutralized with a base selected from the group consisting of alkali metal hydroxide, alkaline earth metal hydroxide and combinations thereof, said homopolymer having been further neutralized with a volatile base to a pH of at least 7; and
crosslinking agent,
said composition comprising from about 20% by weight to about 40% by weight solids and having a viscosity of from about 100 cPs to about 2500 cPs at 25° C.

2. The aqueous composition of claim 1, wherein said α-β-ethylenically unsaturated carboxylic acid monomer is selected from the group consisting of methacrylic acid, crotonic acid, maleic acid, maleic acid anhydride, itaconic acid, and fumaric acid.

3. The aqueous composition of claim 1, wherein said α-β-ethylenically unsaturated carboxylic acid monomer comprises acrylic acid.

4. The aqueous composition of claim 1, wherein said alkali metal hydroxide is selected from the group consisting of sodium hydroxide, potassium hydroxide and mixtures thereof.

5. The aqueous composition of claim 1, wherein said alkaline earth metal hydroxide comprises calcium hydroxide.

6. The aqueous composition of claim 1, wherein said volatile base comprises ammonium hydroxide.

7. The aqueous composition of claim 1 having a pH of from 7 to about 10.

8. The aqueous composition of claim 1, wherein said crosslinking agent comprises ammonium zirconyl carbonate.

9. The aqueous composition of claim 1, wherein said composition, when dry, absorbs at least 50 times its polymer weight in water.

10. An aqueous composition comprising:

a polymer derived from monomers consisting of water soluble α-β-ethylenically unsaturated carboxylic acid monomers, said polymer having been from about 75% to 95% neutralized with a base selected from the group consisting of alkali metal hydroxide, alkaline earth metal hydroxide and combinations thereof, said polymer having been further neutralized with a volatile base to a pH of at least 7; and a crosslinking agent, said composition comprising from about 20% by weight to about 40% by weight solids and having a viscosity of from about 100 cPs to about 2500 cPs at 25° C.

11. The aqueous composition of claim 10, wherein said α-β-ethylenically unsaturated carboxylic acid monomers are selected from the group consisting of acrylic acid, methacrylic acid, crotonic acid, maleic acid, maleic acid anhydride, itaconic acid, fumaric acid and combinations thereof.

* * * * *